United States Patent
Hsu

(10) Patent No.: US 10,891,824 B2
(45) Date of Patent: Jan. 12, 2021

(54) SIDE RECORDING SYSTEM FOR GAMING DEVICE

(71) Applicant: Tien-Shu Hsu, Taichung (TW)

(72) Inventor: Tien-Shu Hsu, Taichung (TW)

( * ) Notice: Subject to any disclaimer, the term of this patent is extended or adjusted under 35 U.S.C. 154(b) by 0 days.

(21) Appl. No.: 15/564,358

(22) PCT Filed: Jul. 8, 2015

(86) PCT No.: PCT/CN2015/083597
§ 371 (c)(1),
(2) Date: Oct. 4, 2017

(87) PCT Pub. No.: WO2017/004813
PCT Pub. Date: Jan. 12, 2017

(65) Prior Publication Data
US 2018/0130292 A1 May 10, 2018

(51) Int. Cl.
*G07F 17/32* (2006.01)
*A63F 13/00* (2014.01)
(Continued)

(52) U.S. Cl.
CPC .......... *G07F 17/3239* (2013.01); *A63F 13/00* (2013.01); *G06K 9/00771* (2013.01);
(Continued)

(58) Field of Classification Search
CPC ... A63F 13/00; G06K 9/00771; G07F 17/322; G07F 17/3239; G07F 17/3241; H04N 7/18; H04N 7/188
See application file for complete search history.

(56) References Cited

U.S. PATENT DOCUMENTS

| 2005/0012818 A1* | 1/2005 | Kiely | G07F 19/20 348/143 |
| 2006/0252521 A1* | 11/2006 | Gururajan | A63F 1/00 463/29 |

(Continued)

FOREIGN PATENT DOCUMENTS

| CN | 102933268 A | 2/2013 |
| CN | 103079659 A | 5/2013 |
| CN | 104203359 A | 12/2014 |

*Primary Examiner* — Francis Geroleo
(74) *Attorney, Agent, or Firm* — Muncy, Geissler, Olds & Lowe, P.C.

(57) ABSTRACT

A side recording system for gaining device is intended for side recording of a gaming machine platform and mainly functions such that beginning and ending of event of gaining machine platform is monitored by a game state monitoring device to control an image acquisition device to acquire images of a game display unit and generate side-recorded videos, stored into a data storage unit, indicative of game session numbers and events; or a continuously side-recorded video can be recorded continuously, beginning and ending time points of event together with associated positions of beginning and ending time points of event corresponding to the continuously side-recorded video are recorded by an association recording unit, and an association recording table and the continuously side-recorded video are stored into the data storage unit. Thus, management staff can retrieve the required side-recorded videos rapidly to show what actually happens at once and take appropriate counter measures.

10 Claims, 7 Drawing Sheets

(51) Int. Cl.
*H04N 7/18* (2006.01)
*G06K 9/00* (2006.01)

(52) U.S. Cl.
CPC ........ *G07F 17/322* (2013.01); *G07F 17/3241* (2013.01); *H04N 7/18* (2013.01); *H04N 7/188* (2013.01)

(56) References Cited

U.S. PATENT DOCUMENTS

| | | | | |
|---|---|---|---|---|
| 2007/0015583 | A1* | 1/2007 | Tran | G07F 17/32 463/40 |
| 2008/0113783 | A1* | 5/2008 | Czyzewski | A63F 3/00157 463/29 |
| 2009/0191933 | A1* | 7/2009 | French | G07F 17/32 463/12 |
| 2014/0094239 | A1* | 4/2014 | Grauzer | G07F 17/3293 463/13 |
| 2017/0161987 | A1* | 6/2017 | Bulzacki | G06K 9/00577 |
| 2017/0236372 | A1* | 8/2017 | Bulzacki | G07F 17/32 463/43 |

* cited by examiner

SIDE RECORDING SYSTEM FOR GAMING DEVICE

FIELD OF THE INVENTION

The present invention is related to a casino management system, particularly to a monitor system used for casino management.

BACKGROUND OF THE INVENTION

Referring to FIGS. 1 and 2, a casino is provided for placing a plurality of gaming devices which are provided for gainers to play games. The gaining devices are primarily divided into machine platform-type gaming machine platforms 1 (as illustrated in FIG. 1) and physical desktops 2 with dealers dealing the cards (as illustrated in FIG. 2), both of which may be provided for gainers to play.

For the purpose of security and perpetuation of evidence, and ensuring successful function of the plurality of gaming devices, it is necessary to handle the situation of all gaming devices in the casino.

Therefore, the casino is generally provided with a casino monitoring system including a plurality of monitoring lenses 3 and a plurality of monitoring screens (not shown) corresponding to the plurality of monitoring lenses 3. The plurality of monitoring lenses 3 are used for monitoring the operation of the plurality of gaining devices (gaining machine platforms 1 or physical desktops 2). Moreover, the plurality of monitoring lenses 3 and the plurality of gaming devices may be provided in a manner of one-to-one, many-to-one or one-to-many depending on the need and the requirement of on-site condition so as to meet the requirement of all-around monitoring.

Therefore, the management staff is then possible to monitor the plurality of monitoring screens constantly, such that the situation happening to the plurality of gaining devices is notified at once, and the truth is clarified via image evidence to facilitate taking appropriate counter measures if the controversial event occurs.

In the conventional casino monitoring system, however, when the controversial event happens to the gaining devices in the practical operation, it is required for the management staff to take a long time to retrieve images recorded by the casino monitoring system if the image evidence is needed to clarify the reason for the controversial event. In fact, moreover, there is also much controversy in confirming association between the controversial event (one outcome of the game) and the image evidence. Thereby, it is not only time-consuming and laborious, but also generally impossible to take proper counter measures at once. In other words, performing time comparison manually, browsing through image evidence slowly, and then acquiring corresponding image segment are considerably time-consuming and laborious and are apt to cause misjudgment, so as to be performed seldom in practice unless a serious event occurs.

SUMMARY OF THE INVENTION

Accordingly, it is the main object of the present invention to provide a side recording system for gaming device, allowed for recording the side-recorded videos corresponding to the event happening to the gaming machine platform so as to find the side-recorded video with respect to the controversial event out rapidly and properly to facilitate the management staff to take the most appropriate counter measure at once in case of controversial event.

On the basis of the above object, the present invention may be mainly implemented in two ways.

In a first implementation, the present invention is provided for side-recording a gaming machine platform. The gaining machine platform is provided with a game display unit including a game state monitoring device, an image acquisition device and a data storage unit, in which the game state monitoring device is connected to the gaming machine platform, as well as is allowed to monitor the beginning and ending of an event of the gaming machine platform and then generate a starting signal and an end signal at the beginning and the ending of the generation of the event, respectively.

Moreover, the image acquisition device is connected to the game state monitoring device and the gaming machine platform. The image acquisition device is started to acquire images of the game display unit when the starting signal is received, and is stopped when the end signal is received, so as to generate a plurality of side-recorded videos indicative of the event. The data storage unit is then connected to the image acquisition device, as well as is allowed to receive and store the plurality of side-recorded videos.

In a second implementation, the image acquisition device of the present invention is also allowed to acquire images of the gaming device so as to generate a continuously side-recorded video. Moreover, the game state monitoring device is allowed to generate a beginning time point and an ending time point directly at the beginning and the ending of the generation of the event, respectively, while an association recording unit is allowed to connect to the game state monitoring device and the image acquisition device, so as to record beginning and ending time points of the event, as well as associated positions of the beginning and ending time points of the event corresponding to the continuously side-recorded video, and then generate an association recording table. Moreover, the data storage unit is then allowed to receive and store the continuously side-recorded video and the association recording table.

Thereby, the present invention is provided for monitoring the beginning and ending of the event of the gaming machine platform via the game state, as well as utilizing the image acquisition device to acquire images of the game display unit, so as to generate a plurality of side-recorded videos indicative of events. Thereby, the management staff may be allowed to find the corresponding side-recorded video out as rapidly as possible in case of controversy in the future, due to the plurality of side-recorded videos respectively indicative of events. Another implementation is provided for recording the continuously side-recorded video, and generating the association recording table via the association recording unit recording the beginning and ending time points of the event as well as the associated positions of the beginning and ending time points of the event corresponding to the continuously side-recorded video. Therefore, the management staff is similarly allowed to find the corresponding image segment from the continuously side-recorded video out via the association recording table as rapidly as possible in case of controversy. Thus, the management staff can retrieve the image with respect to the controversial event rapidly and properly to show what actually happens so as to take proper counter measures at once.

DETAILED DESCRIPTION OF THE PREFERRED EMBODIMENTS

Figure 1:
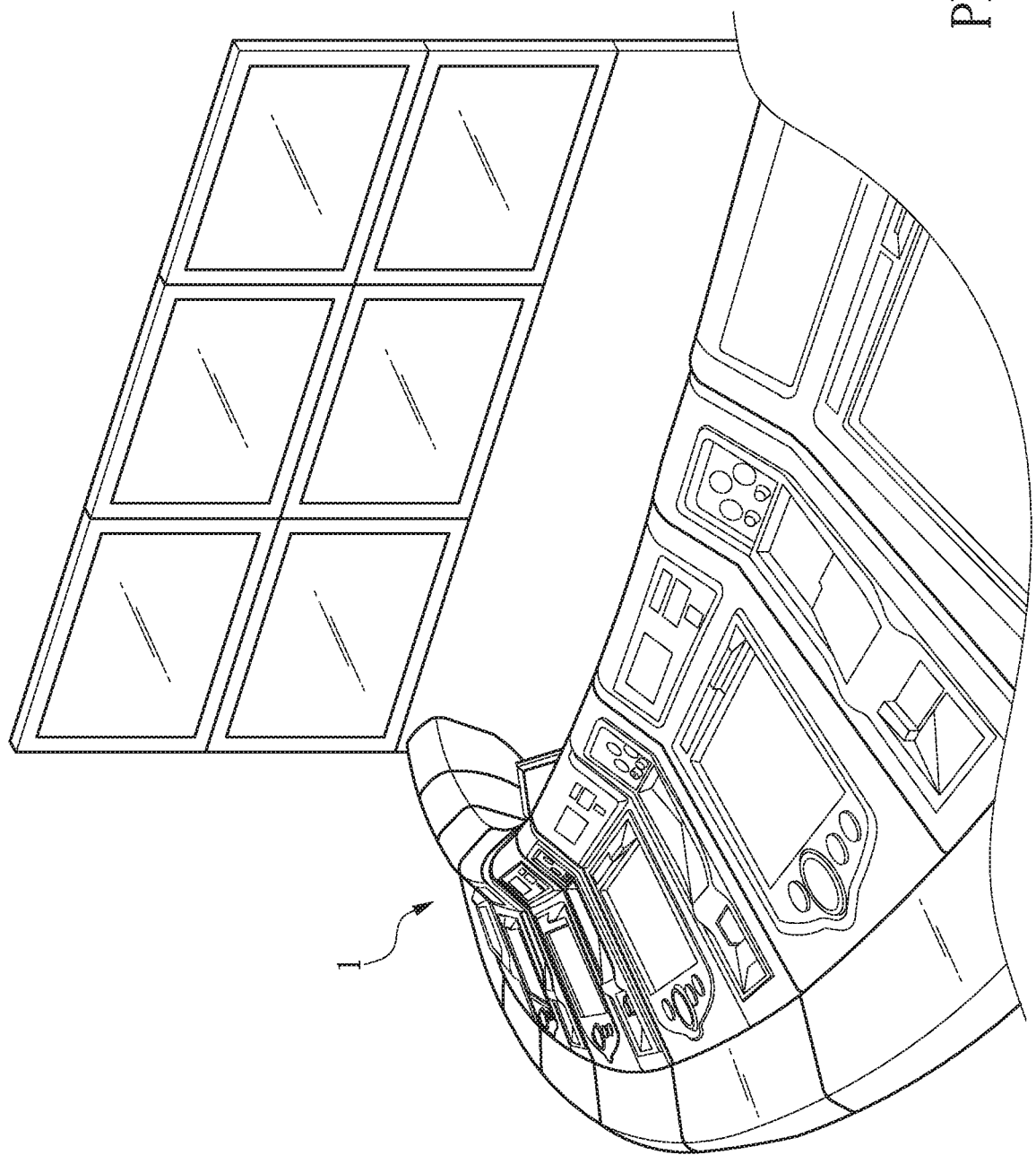
FIG. 1 is a real figure of a conventional gaining machine platform.
Figure 1:
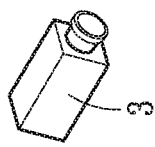
Figure 2:
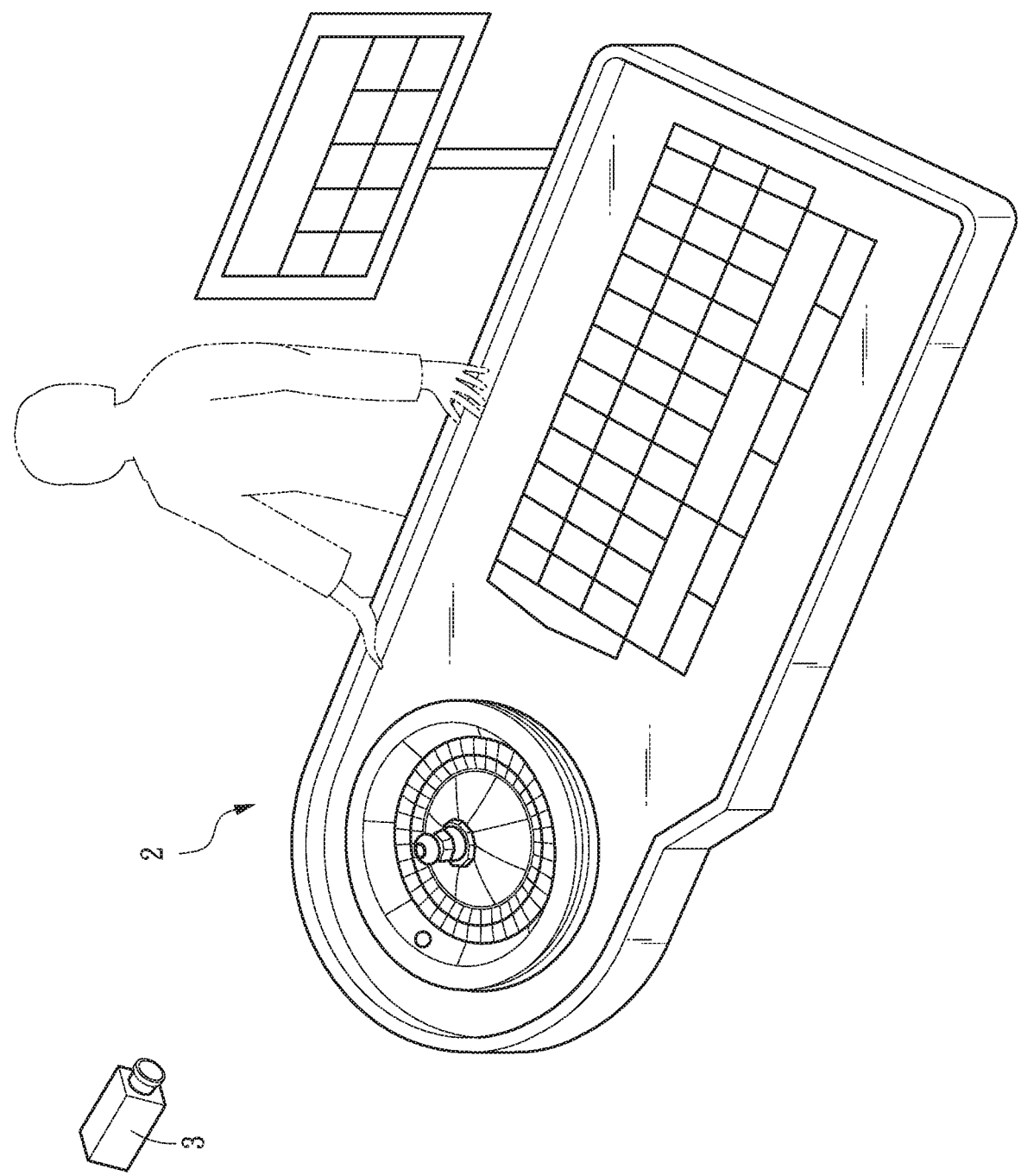
FIG. 2 is a real figure of a conventional physical desktop.
Figure 3:
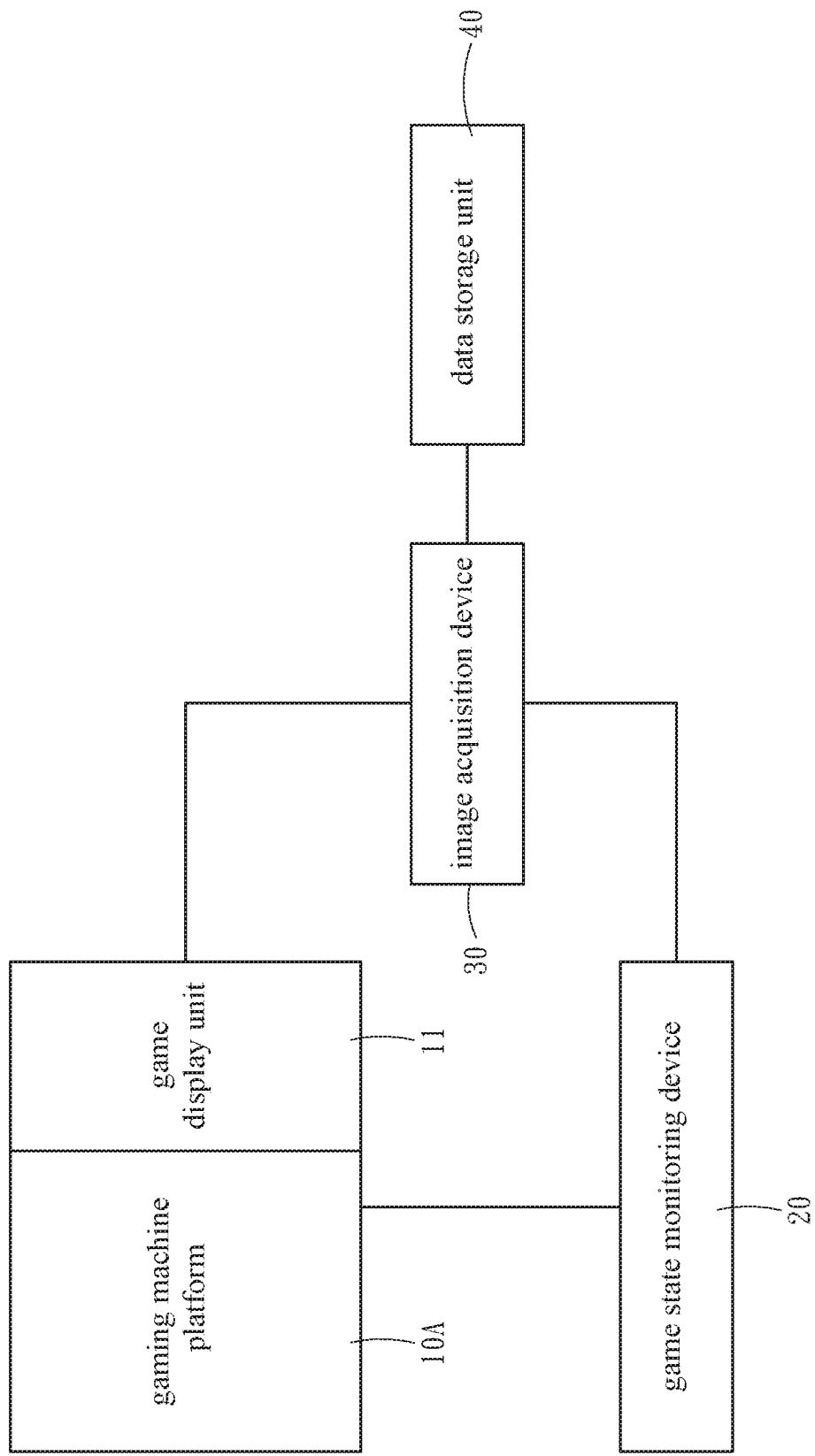
FIG. 3 is a system architecture diagram of a first embodiment of the present invention.

Referring to FIG. 3, there is shown a system architecture diagram of a first embodiment of the present invention, which is provided for side-recording a gaming machine platform 10A. The gaming machine platform 10A is provided with a game display unit 11 including a game state monitoring device 20, an image acquisition device 30 and a data storage unit 40, in which the game state monitoring device 20 is connected to the gaming machine platform 10A, as well as is allowed to monitor the beginning and ending of an event of the gaming machine platform 10A and then generate a starting signal and an end signal at the beginning and the ending of the generation of the event, respectively.

The event may be a process of a game. The game state monitoring device 20 is allowed to retrieve the game session number of each round of the game, and generate the starting signal and the end signal of the event based on the beginning time point and the ending time point of each round of the game, respectively.

Alternatively, the event may be a wagering interface operation. The starting signal and the end signal of the event are generated when the wagering interface operation is performed by the gainer through the game being started, respectively. Taking the slot machine as an example, the starting signal is generated when the gainer starts to wager, such as betting on how many lines, which category and etc., for example, and the end signal is generated when wagering by the gainer is ended while the game is started.

Alternatively, the event may be a member system operation. The starting signal and the end signal of the event are generated when the gamer accesses the screen of the member system operation and exits the screen of the member system operation, respectively.

Alternatively, the event may be an exceptional event of platform, which includes opened platform door, faulty platform, no action, or other obviously abnormal situations, but is not limited thereto. The starting signal and the end signal of the event are generated when the exceptional event of platform happens to the gaining machine platform 10A and when the exceptional event of platform stops, respectively.

The image acquisition device 30 is connected to the game state monitoring device 20 and the gaming machine platform 10A. The image acquisition device 30 is started to acquire images of the game display unit 11 when the starting signal is received, and is stopped when the end signal is received, so as to generate a plurality of side-recorded videos indicative of the game session numbers and the events. Moreover, the data storage unit 40 is connected to the image acquisition device 30, as well as is allowed to receive and store the plurality of side-recorded videos.

Figure 4:
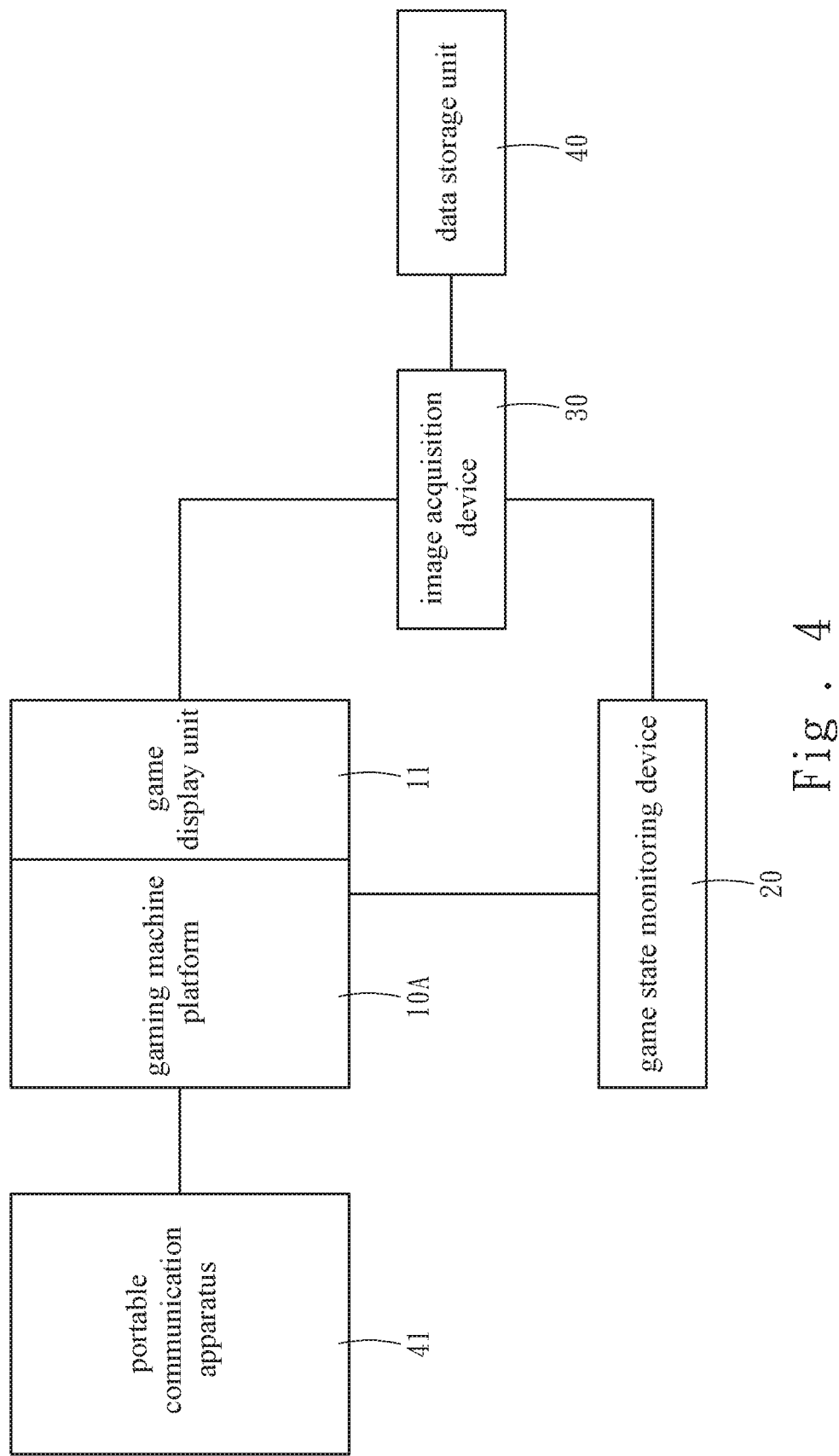
FIG. 4 is another system architecture diagram of the first embodiment of the present invention.

Referring to FIG. 4, there is shown another system architecture diagram of the first embodiment of the present invention. The present invention further includes a portable communication apparatus 41. The portable communication apparatus 41 may be a tablet, mobile phone, mobile computer and so on. The plurality of side-recorded videos of the data storage unit 40 may be retrieved via the wired or wireless connection of the portable communication apparatus 41 to the gaming machine platform 10A.

Figure 5:
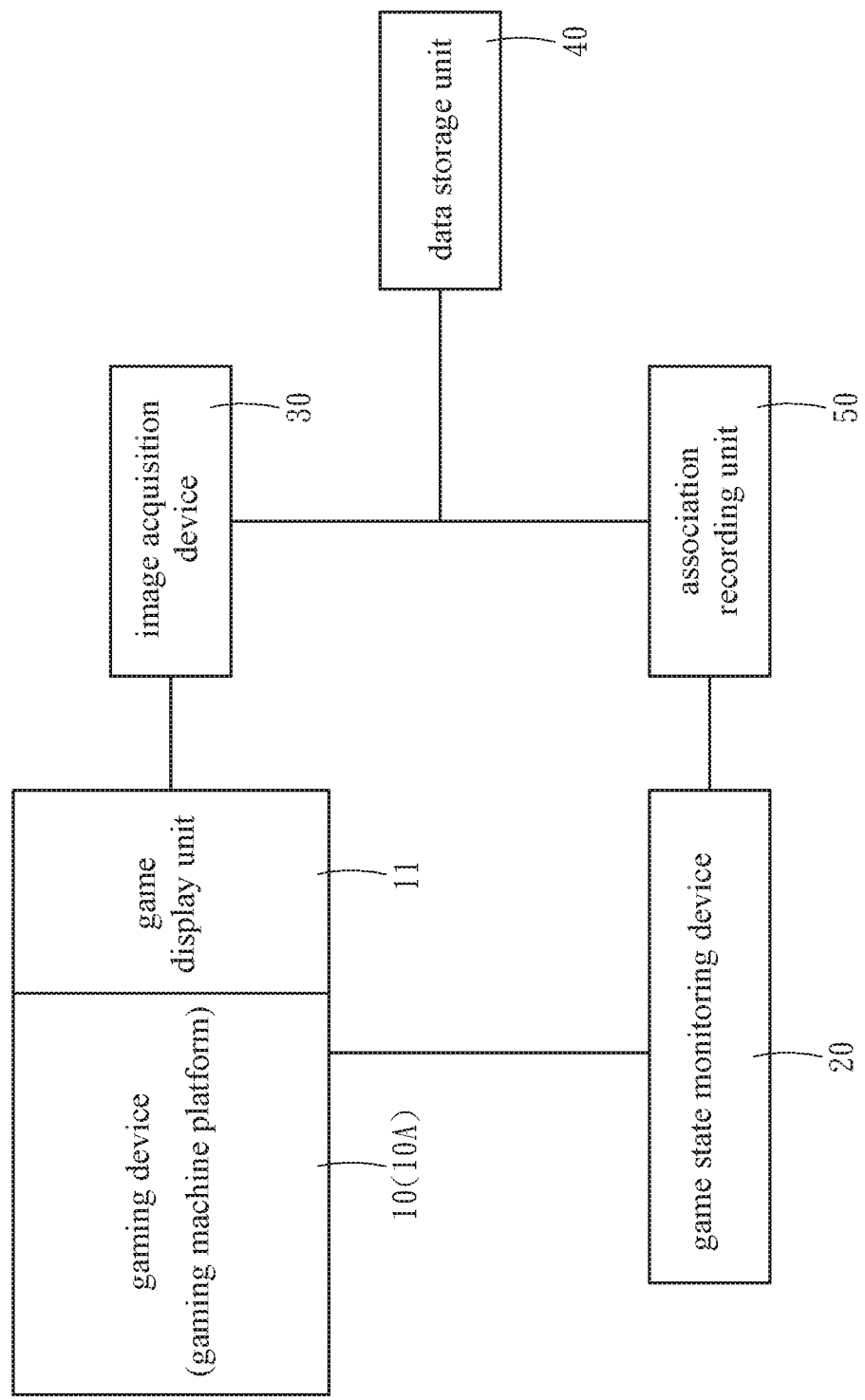
FIG. 5 is a system architecture diagram of a second embodiment of the present invention.

Referring to FIG. 5, there is shown a system architecture diagram of a second embodiment of the present invention. Similarly, in the second embodiment, a gaining device 10 is side-recorded, while the image acquisition device 30 is connected to the gaining device 10 so as to acquire the image of the gaining device 10 and then generate a continuously side-recorded video. The gaining device 10 may be a gaming machine platform 10A having a game display unit 11. The image acquisition device 30 is then allowed to acquire the image of the game display unit 11.

The game state monitoring device 20 is similarly connected to the gaining device 10, as well as is allowed to monitor the beginning and ending of an event of the gaming machine platform 10A, and generate a beginning time point and an ending time point at the beginning and the ending of the generation of the event, respectively.

In the implementation, the event may be a process of a game. The beginning and ending time points of each round of the game are the beginning time point and the ending time point. Moreover, the game state monitoring device 20 may be allowed to retrieve the game session number of each round of the game.

Alternatively, the event may be a wagering interface operation. The time when the wagering interface is performed by the gamer through the time point when the game is started is equivalent to the beginning time point through the ending time point. The wagering interface operation is, in more detail, the operation operated by the gamer on the wagering interface of the gaming machine platform 10A, and may be the operation performed with a physical button or a touch screen, depending on the type of the gaining machine platform 10A, so as to wager.

Alternatively, the event may be a member system operation. The time points when the gamer accesses the screen of the member system operation and exits the screen of the member system operation are the beginning time point and the ending time point, respectively.

Alternatively, the event may be an exceptional event of platform. The time points when the exceptional event of platform happens to the gaming machine platform 10A and when the exceptional event of platform stops are the beginning time point and the ending time point, respectively.

Furthermore, the second embodiment further includes an association recording unit 50. The association recording unit 50 is connected to the game state monitoring device 20 and the image acquisition device 30, as well as is allowed to record the game session number of each round of the game (in the case of considering the process of the game as an event), beginning and ending time points of the event, as well as associated positions of the beginning and ending time points of the event corresponding to the continuously side-recorded video, so as to generate an association recording table. Moreover, the data storage unit 40 is then connected to the association recording unit 50 and the image acquisition device 30, as well as is allowed to receive and store the continuously side-recorded video and the association recording table.

Figure 6:
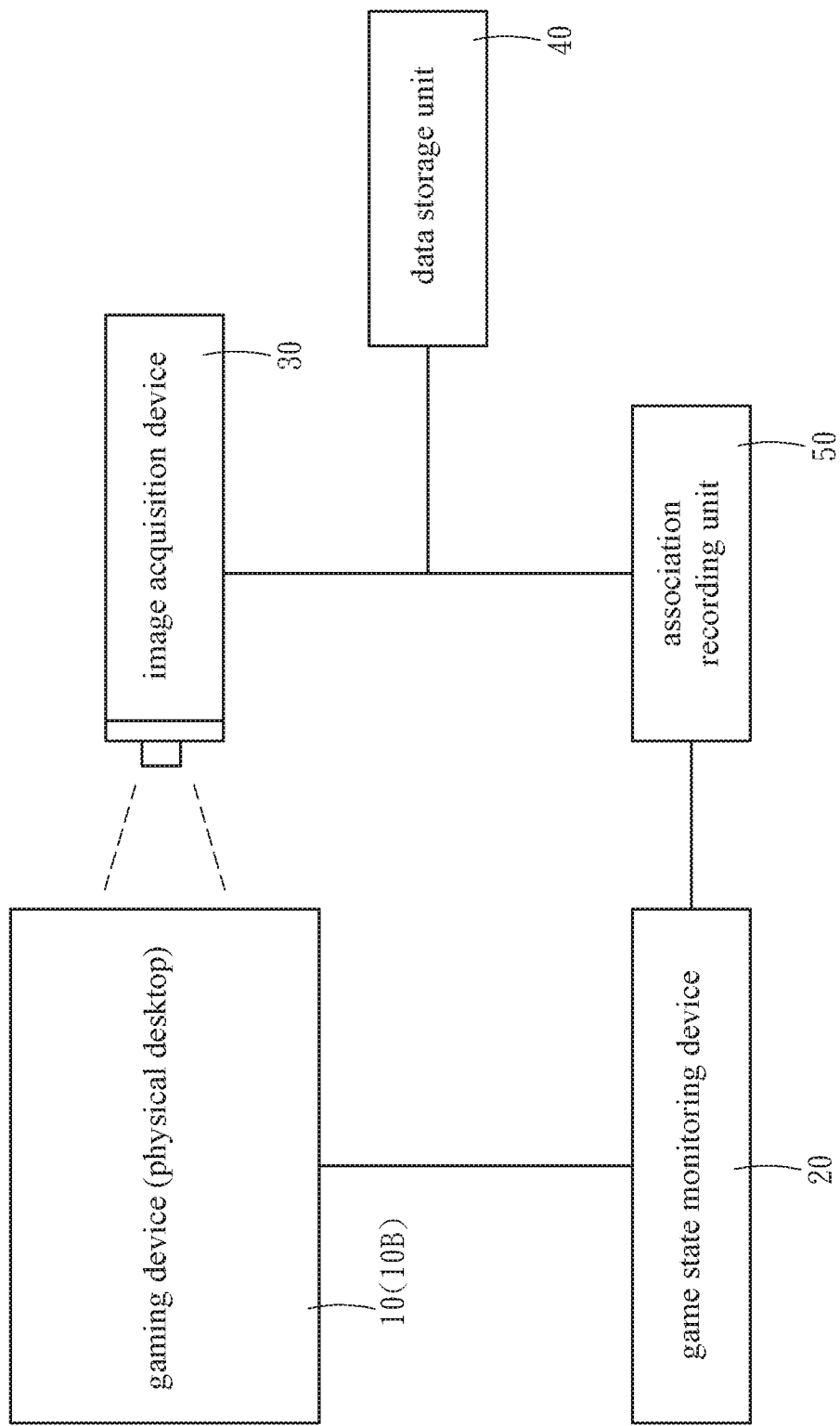
FIG. 6 is another system architecture diagram of the second embodiment of the present invention.

Referring to FIG. 6, there is shown another system architecture diagram of the second embodiment of the present invention. In this case, the gaming device 10 may be a physical desktop 10B, while the image acquisition device 30 is then allowed to acquire the on-site image of the physical desktop 10B.

Figure 7:
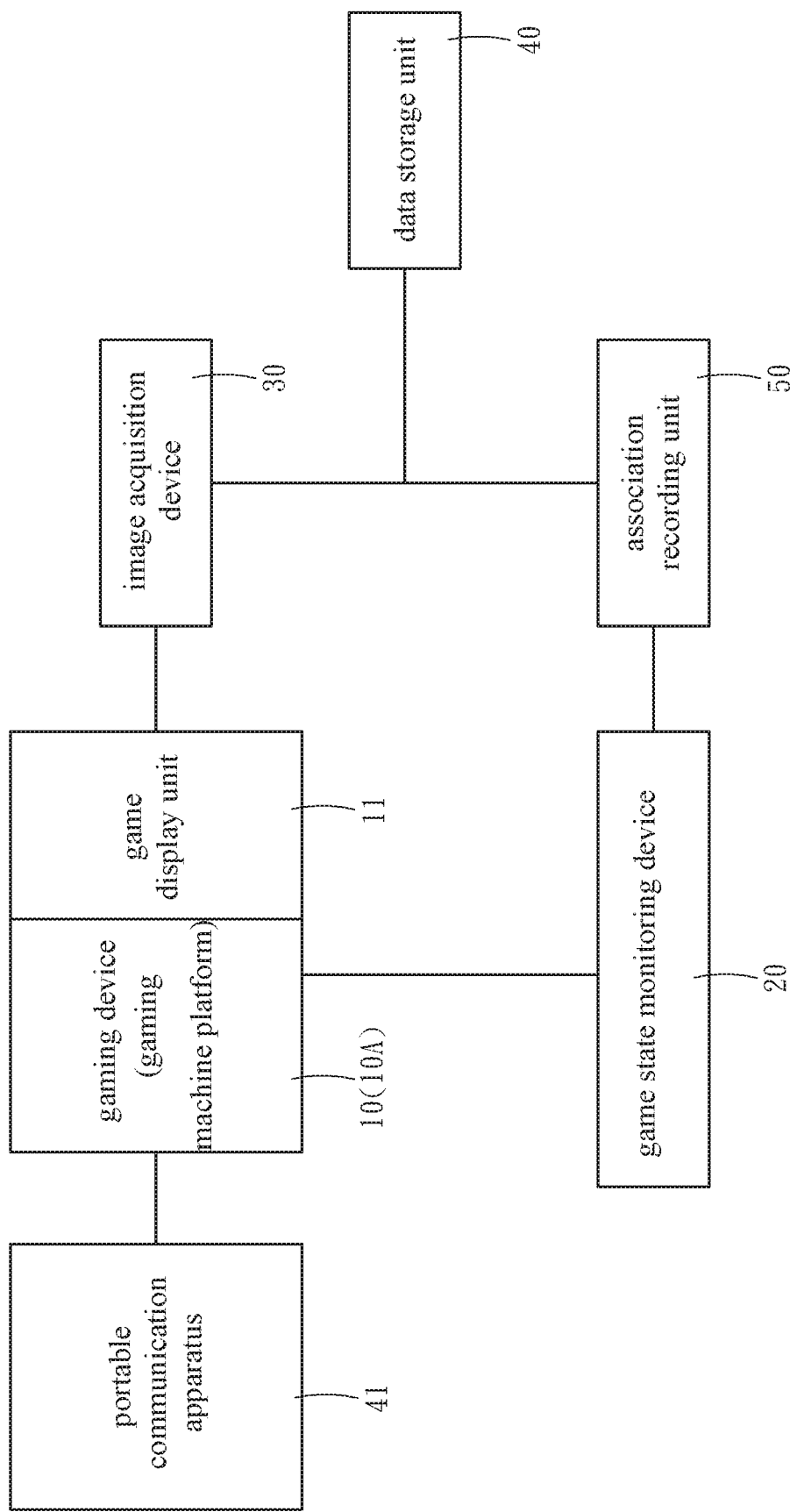
FIG. 7 is a further system architecture diagram of the second embodiment of the present invention.

Referring to FIG. 7, there is shown a further system architecture diagram of the second embodiment of the present invention. Similarly, a portable communication apparatus 41 may be further included in this embodiment. The continuously side-recorded video and the association recording table of the data storage unit 40 are retrieved via the connection of the portable communication apparatus 41 to the gaming machine platform 10A.

As described above, it is primary for the present invention to monitor the beginning and ending of the event of the gaming machine platform 10A via the game state, as well as control the image acquisition device 30 to acquire images of the game display unit 11 at the beginning and ending time points of the event and then generate a plurality of side-recorded videos indicative of events. Thereby, the management staff may be allowed to find the corresponding side-recorded video out as rapidly as possible in case of controversy in the future.

In another implementation, alternatively, it is also possible to record the continuously side-recorded video, and generate the association recording table via the association recording unit 50 recording the beginning and ending time points of the event as well as the associated positions of the beginning and ending time points of the event corresponding to the continuously side-recorded video. Therefore, the management staff may be similarly allowed to find the corresponding image segment from the continuously side-recorded video out via the association recording table as rapidly as possible in case of controversy.

Thereby, the management staff is capable of retrieving the image with respect to the controversial event rapidly and properly only if the game session number and the category of event are notified, so as to show what actually happens to facilitate the management staff to take proper counter measures at once, whereby the usage requirement is satisfied.

What is claimed is:

1. A side recording system for gaming device, provided for side-recording a gaming device, which is a gaming machine platform with a game display unit, characterized by comprising:
   an image acquisition device, said image acquisition device being connected to said gaming device so as to acquire images of said game display unit and then generate a continuously side-recorded video;
   a game state monitoring device, said game state monitoring device connecting and monitoring said gaming device to determine if said gaming machine platform executes an event which is a process of a game, wherein said game state monitoring device generates a beginning time point and an ending time point at the beginning and the ending of said event, respectively, if said event is occurred;
   an association recording unit, said association recording unit being connected to said game state monitoring device and said image acquisition device, said association recording unit receiving said beginning and ending time points of said event and said continuously side-recorded video, wherein said association recording unit correlates said beginning and ending time points with a timeline of said continuously side-recorded video to generate an association recording table; and
   a data storage unit, said data storage unit being connected to said association recording unit and said image acquisition device, as well as being allowed to receive and store said continuously side-recorded videos and said association recording table.

2. The side recording system for gaming device according to claim 1, wherein the beginning and ending time points of each round of said game is the beginning time point and the ending time point, and that said game state monitoring device is allowed to retrieve the game session number of each round of said game, said association recording unit recording the game session number of each round of said game.

3. The side recording system for gaming device according to claim 1, further comprising a portable communication apparatus, said continuously side-recorded video and said association recording table of said data storage unit being retrieved via the connection of said portable communication apparatus to said gaming device.

4. A side recording system for gaming device, provided for side-recording a gaming device, which is a gaming machine platform with a game display unit, characterized by comprising:
   an image acquisition device, said image acquisition device being connected to said gaming device so as to acquire images of said game display unit and then generate a continuously side-recorded video;
   a game state monitoring device, said game state monitoring device connecting and monitoring said gaming device to determine if said gaming machine platform executes an event which is a wagering interface operation, wherein said game state monitoring device generates a beginning time point and an ending time point at the beginning and the ending of said event, respectively, if said event is occurred;
   an association recording unit, said association recording unit being connected to said game state monitoring device and said image acquisition device, said association recording unit receiving said beginning and ending time points of said event and said continuously side-recorded video, wherein said association recording unit correlates said beginning and ending time points with a timeline of said continuously side-recorded video to generate an association recording table; and
   a data storage unit, said data storage unit being connected to said association recording unit and said image acquisition device, as well as being allowed to receive and store said continuously side-recorded videos and said association recording table.

5. The side recording system for gaming device according to claim 4, wherein the time when said wagering interface operation is performed by the gamer through the time point when the game is started is equivalent to the beginning time point through the ending time point.

6. The side recording system for gaming device according to claim 5, wherein said wagering interface operation is operated with a physical button or a touch screen of said gaming device.

7. The side recording system for gaming device according to claim 4, further comprising a portable communication apparatus, said continuously side-recorded video and said association recording table of said data storage unit being retrieved via the connection of said portable communication apparatus to said gaming device.

8. A side recording system for gaming device, provided for side-recording a gaming device, which is a gaming machine platform with a game display unit, characterized by comprising:
   an image acquisition device, said image acquisition device being connected to said gaming device so as to acquire images of said game display unit and then generate a continuously side-recorded video;

a game state monitoring device, said game state monitoring device connecting and monitoring said gaming device to determine if said gaming machine platform executes an event which is a member system operation, wherein said game state monitoring device generates a beginning time point and an ending time point at the beginning and the ending of said event, respectively, if said event is occurred;

an association recording unit, said association recording unit being connected to said game state monitoring device and said image acquisition device, said association recording unit receiving said beginning and ending time points of said event and said continuously side-recorded video, wherein said association recording unit correlates said beginning and ending time points with a timeline of said continuously side-recorded video to generate an association recording table; and a data storage unit, said data storage unit being connected to said association recording unit and said image acquisition device, as well as being allowed to receive and store said continuously side-recorded videos and said association recording table.

9. The side recording system for gaming device according to claim 8, wherein the time points when the gamer accesses the screen of said member system operation and exits the screen of said member system operation is the beginning time point and the ending time point, respectively.

10. The side recording system for gaming device according to claim 8, further comprising a portable communication apparatus, said continuously side-recorded video and said association recording table of said data storage unit being retrieved via the connection of said portable communication apparatus to said gaming device.

\* \* \* \* \*